United States Patent [19]

Eidsmore

[11] Patent Number: 5,303,734
[45] Date of Patent: Apr. 19, 1994

[54] PRESSURE REGULATOR

[76] Inventor: Paul G. Eidsmore, 1700 Granite Creek Rd., Santa Cruz, Calif. 95065

[21] Appl. No.: 12,299

[22] Filed: Feb. 1, 1993

[51] Int. Cl.[5] .............................................. G05D 16/02
[52] U.S. Cl. ................................. 137/505.43; 251/64; 251/80; 251/337
[58] Field of Search .................. 137/505.39, 505.43; 251/64, 80, 85, 337

[56] References Cited

U.S. PATENT DOCUMENTS

| | | | |
|---|---|---|---|
| 2,573,522 | 10/1951 | Watt | 251/64 X |
| 2,827,077 | 3/1958 | Mitchell | 251/64 X |
| 4,203,554 | 5/1980 | Zimmer et al. | 251/337 X |
| 4,848,726 | 7/1989 | Hary | 251/337 X |
| 4,915,127 | 4/1990 | Worley | 137/966 X |
| 5,033,505 | 7/1991 | Eidsmore . | |
| 5,062,449 | 11/1991 | Woollums et al. | 251/64 X |

*Primary Examiner*—Stephen M. Hepperle
*Attorney, Agent, or Firm*—Fay, Sharpe, Beall, Fagan, Minnich & McKee

[57] ABSTRACT

A pressure regulator includes a housing having a chamber that receives a pressure responsive member. The pressure responsive member includes an internal charge that allows a movable portion of the regulator to react in response to pressure differentials. A preferred embodiment of the regulator includes a dampening member defined by an O-ring that exerts a drag on the pressure responsive member to address oscillations associated with high flow rates. The dampening force can be varied according to the subject invention. Moreover, a normally planar poppet retaining member reduces manufacturing costs of the regulator and allows for a highly polished surface to address concerns with impurities. A biasing arrangement is also incorporated into the regulator to assure that the poppet seals against the valve seat if the internal pressure charge of the regulator is lost.

21 Claims, 2 Drawing Sheets of the pressure responsive member. The dampening means exerts a slight drag on the axial movement of the movable portion which has proved to be highly effective in addressing the oscillation problem encountered at high flow rates.

PRESSURE REGULATOR

BACKGROUND OF THE INVENTION

This invention pertains to the art of pressurized fluid systems and more particularly to an apparatus for regulating the pressure in the system.

The invention is applicable to a pressure regulator and will be described with particular reference thereto. However, it will be appreciated that selected aspects of the invention may have application in related fluid environments and uses.

U.S. Pat. No. 5,033,505 discloses a predecessor pressure regulator, the disclosure of that patent being hereby incorporated by reference. The structure disclosed therein includes a pressure responsive member disposed in a hermetically sealed housing. The pressure responsive member includes a stationary portion fixed to the housing and a movable portion interconnected thereto by a flexible member, such as a bellows. The pressure responsive member has a predetermined pressure charge enclosed therein so that axial movement occurs varying the volume and pressure in response to fluid pressure in the housing.

A self-threading poppet assembly is secured to the movable portion of the pressure responsive member. Preferably, a poppet is disposed in an inlet fluid line and cooperates with a valve seat defined at the interconnection of the inlet fluid line and the housing. The poppet is comprised of a suitable seal material that is preferably tapped upon threaded engagement with a poppet stem. This arrangement provides for a controlled, precise opening between the poppet and valve seat so that desired operational characteristics of the regulator can be achieved in accordance with design parameters.

As disclosed in the '505 patent, the poppet assembly is secured to the pressure responsive member by means of a stem clip. The stem clip includes a series of bent portions for reasons set forth in the patent. Although adequately addressing particular needs of the industry, it has been deemed desirable to provide an alternative arrangement that is less expensive to manufacture and satisfies other criteria. For example, the detailed bending in the prior arrangement consequentially raises the cost of manufacture of the stem clip. Unfortunately, the bent configuration of the clip also does not lend itself to providing a highly polished surface finish. Since certain fluid systems using these types of regulators have stringent cleanliness standards, the surface finish of each component of the regulator can be very critical.

As also detailed in the '505 patent, at high flow rates, known pressure regulators have a tendency to oscillate. In fact, the oscillations occasionally result in an audible buzzing, and the oscillations can result in pressure variations in the fluid system downstream of the regulator. That patent proposes use of a dampening means, such as an O-ring, interposed between the movable and stationary portions of the pressure responsive member. The dampening means exerts a slight drag on the axial movement of the movable portion which has proved to be highly effective in addressing the oscillation problem encountered at high flow rates.

A potential drawback to this arrangement is the effect of the dampening means on low flow rates. Specifically, the friction between the O-ring and an associated surface can limit the sensitivity of the pressure responsive member at low flow rates. Potentially, minute changes in pressure will not be effectively addressed by a pressure responsive member that incorporates a dampening means intended to resolve oscillation problems associated with high flow rates. Accordingly, it has been deemed desirable to maintain the oscillation dampening features at high flow rates, as well as to address concerns with sensitivity at low flow rates.

Still another benefit of the '505 patent is the provision for moving the pressure responsive member to a closed position if the charge is lost. For example, if the bellows were to leak and release the pressure charge, the poppet would seal against the valve seat and isolate downstream equipment from high pressure. The construction of the bellows tends to flatten under such conditions so that the pressure responsive member, particularly the poppet, moves to a shut-off or closed position with the valve seat. Due to the imprecise nature of the bellows construction, though, it has been deemed desirable to provide a positive action to urge the poppet to a closed position if the bellows loses its internal charge.

SUMMARY OF THE INVENTION

The present invention contemplates a new and improved pressure regulator that overcomes all of the above-referenced problems, and others, and satisfies the additionally enumerated features identified above, providing for effective regulation of fluid pressure.

According to a more limited aspect of the invention, the pressure regulator includes a housing having a chamber, and an inlet and outlet communicating therewith. A pressure responsive member regulates the fluid flow between the inlet and outlet. The pressure responsive member includes a variable dampening means which controls the ease with which the pressure responsive member can move.

According to another aspect of the invention, a poppet retaining means has a normal, generally planar configuration that is inexpensive to manufacture and permits it to be highly polished. Flexing portions of the retaining means are elongated to allow for relative movement between the poppet and pressure responsive member if required.

According to yet another aspect of the invention, the regulator incorporates means for biasing the poppet toward a closed position.

A primary benefit of the new pressure regulator is the ability to vary the sensitivity of the regulator at low fluid rates while still addressing oscillation problems associated with high flow rates.

Another benefit is the reduced cost of manufacturing an improved surface finish associated with the poppet retaining means.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
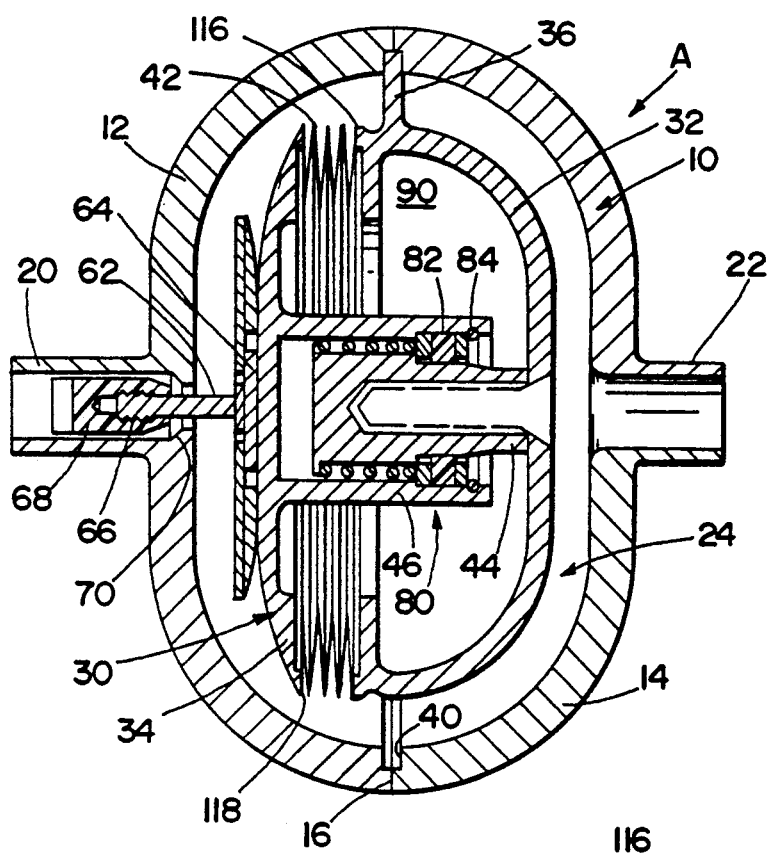
FIG. 1 is a longitudinal cross-sectional view of the subject new pressure regulator in an open position.

Referring now to the drawings wherein the showings are for purposes of illustrating the preferred embodiment of the invention only, and not for purposes of limiting same, the FIGURES show a pressure regulator A incorporated in a fluid system and adapted to reduce pressure from an upstream location, such as a high pressure fluid source (not shown), and reduce it to a low pressure for a downstream use (not shown).

More particularly, and referring to FIG. 1, the illustrated pressure regulator A includes a housing 10 which is formed from cooperating portions 12 and 14. Although the housing portions are shown as upstream and downstream halves, still other arrangements can be used within the scope and intent of the subject invention. Preferably, the housing portions are secured together in a hermetically sealed manner. For example, the housing portions may be welded together along mating edges and as represented by numeral 16. In the illustrated embodiment, the housing includes an inlet 20 that communicates with an upstream fluid line (not shown) to supply pressurized fluid to the housing. Any conventional arrangement for interconnecting the inlet 20 or housing with the fluid line may be used, although the intended environment for the subject regulator is one that is exposed to high pressure, e.g., 3,000 p.s.i. or more, and finds particular application in, for example, the microelectronics industry where ultra clean environments are required. Accordingly, the fluid coupling must satisfy the requirements of the fluid system. It will be recognized, though, that selected aspects of the regulator may be employed in still other, related environments that may have more or less stringent requirements. Likewise, outlet 22 is formed in the housing second portion 14 and communicates with a downstream fluid line (not shown).

Figure 4:
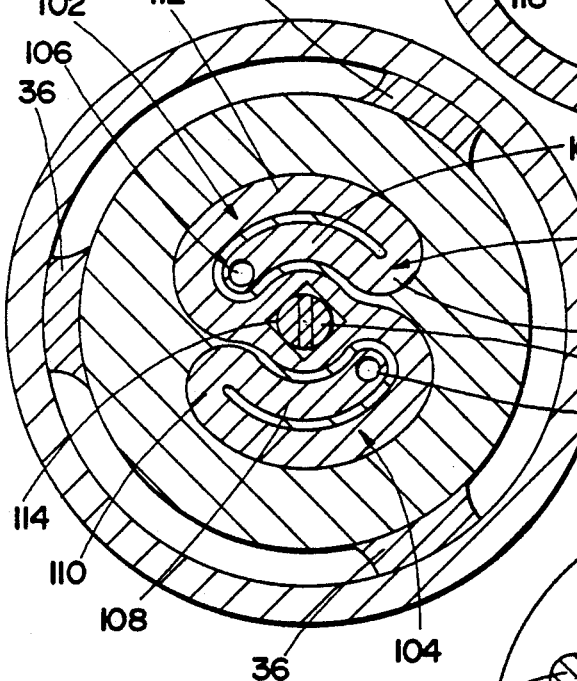
FIG. 4 is a view taken generally along the lines 4—4 of FIG. 1.

The housing has a cavity or chamber 24 that is substantially radially enlarged relative to the cross-sectional dimension of the fluid lines as represented by the inlet and outlet. At least partially secured within the chamber 24 is a pressure responsive member 30 that includes a stationary portion 32 fixed to the housing and a movable portion 34 operatively associated with the stationary portion. Circumferentially spaced legs 36 extend radially outward from the periphery of the stationary portion and are received within a continuous groove 40 in the housing so that when the housing portions are welded together along their mating edges, the stationary portion is also simultaneously secured in fixed relation by the weld. As best illustrated in FIG. 4, the legs 36 have a limited circumferential dimension so that fluid can communicate therepast from the inlet to the outlet.

Figure 3:
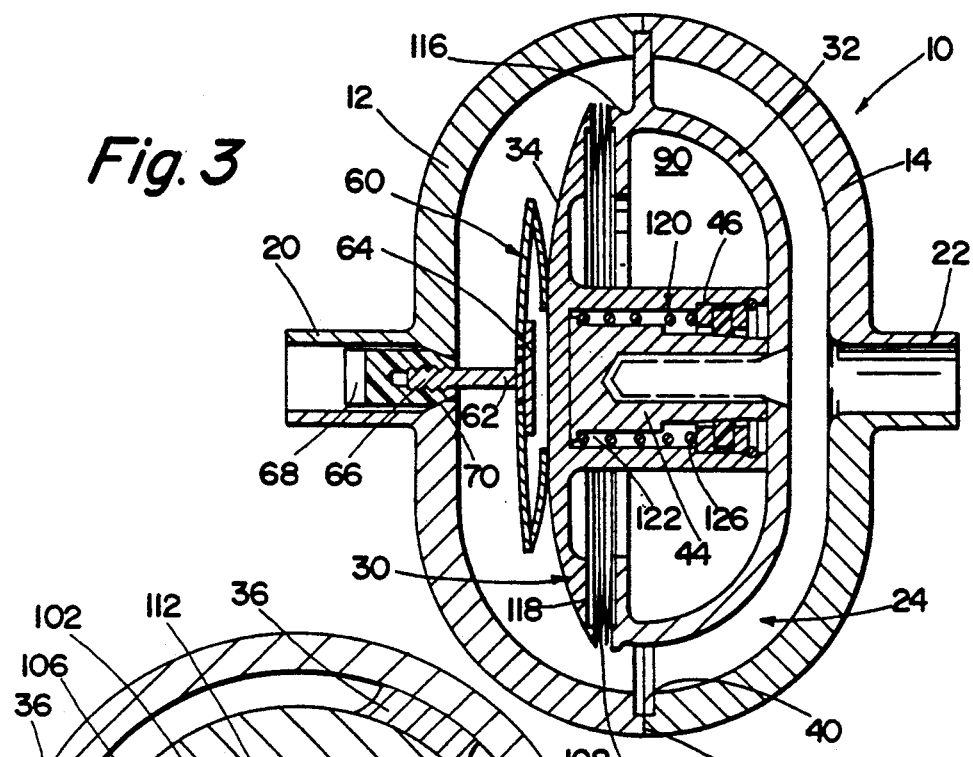
FIG. 3 is a longitudinal cross-sectional view of the pressure regulator in a closed position with a poppet retaining member extended to limit pull out forces imposed on the poppet.

Referring again to FIG. 1, the stationary and movable portions 32, 34 of the pressure responsive member are joined together by a flexible member, such as bellows 42. One preferred form of bellows includes a series of annular members or diaphragms that are alternately secured at radially inner and outer regions to define an accordion-like arrangement. Opposite ends of the bellows assembly are then secured to the stationary and movable portions of the pressure responsive member, respectively. Such a bellows arrangement has a relatively small stack height in a fully collapsed condition (FIG. 3).

Figure 2:
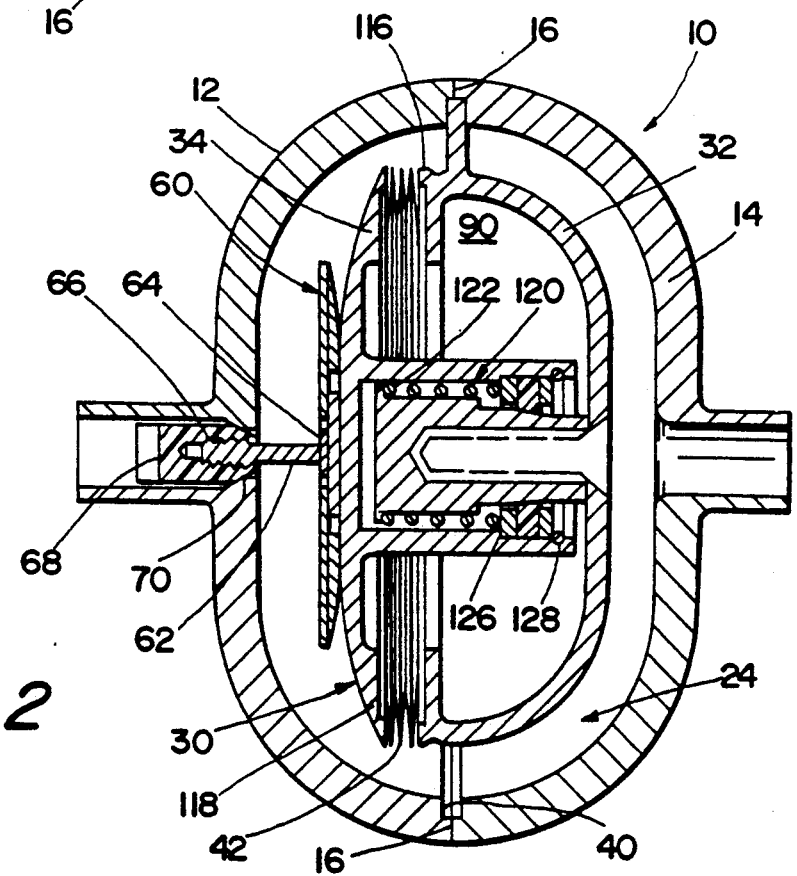
FIG. 2 is a longitudinal cross-sectional view of the pressure regulator in a closed position.

Preferably, the central portion of the stationary and movable portions of the pressure responsive member also cooperate with one another to control axial movement of the movable portion 34 toward and away from inlet 20 in response to varying pressure in the chamber. As shown in FIGS. 1-3, an axial member 44 extends from the stationary portion toward the inlet (leftwardly as shown) and is fixedly secured to the stationary portion 32. This axial member 44 serves multiple purposes to be described below. Surrounding the axial member is a sleeve portion 46 extending from a central region of the movable portion 34 toward outlet 22.

A poppet assembly 60 is secured to the movable portion 34 of the pressure responsive member. More particularly, the poppet assembly includes a stem 62 having an enlarged base 64 defined at a first end thereof. The base is mounted adjacent the pressure responsive member while the stem 62 extends axially toward the inlet 20. In fact, and according to a preferred arrangement, the stem 62 proceeds outwardly of chamber 24 and into the inlet 20 of the regulator. A second or outer end 66 of the stem is threaded and receives an elastomeric member 68 that defines the poppet. Preferably, the poppet is self-tapping so that during assembly, it may be threaded onto the stem, and through a predetermined selected number of turns backed off of valve seat 70 to define a precise opening.

As described above, undesirable oscillations of the pressure responsive member are often associated with high flow rates. To overcome problems associated with the oscillations, a dampening means 80 is provided. Particularly, a preferred arrangement of the dampening means includes an elastomeric or resilient member, such as an O-ring 82, interposed between the axial member 44 and the sleeve portion 46 of the pressure responsive member. As shown, the O-ring 82 is axially and radially constrained by holding member 84. The holding member has a generally U-shaped configuration in cross-section to substantially surround the O-ring, although the inner diameter portion of the O-ring extends from the holding member and is adapted for engagement with the external surface of axial member 44. The engagement between the axial member and the O-ring exerts a drag or dampening force on the movable portion 34 of the pressure responsive member.

That is, an interior cavity 90 of the pressure responsive member has a predetermined pressure charge. The movable portion 34 moves axially in response to the pressure differential between cavity 90 and the fluid pressure in chamber 24. The flexible bellows 42 allows this relative movement and, as will be understood, the poppet member varies its relationship with valve seat 70 to regulate fluid flow between the inlet and outlet. The expansion and contraction of the member 30 in response to the pressure in chamber 24 is thus dampened by the frictional drag imposed by the O-ring.

Figure 5:
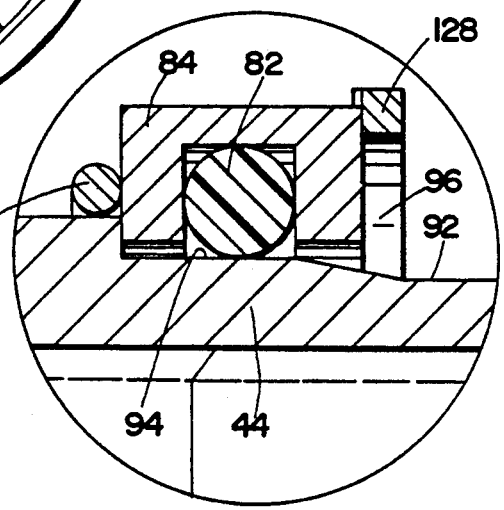
FIG. 5 is an enlarged, detailed view of a preferred assembly for varying a dampening force imposed on a pressure responsive member.

The dampening means includes a means to vary the drag or dampening force. Specifically, one preferred from of varying means provides the external surface of the axial member 44 with discrete, different diameter regions that cooperate with the O-ring 82. As best illustrated in FIG. 5, a reduced diameter region 92 is connected to an enlarged diameter region 94 by a tapered region 96. Thus, when the O-ring is axially positioned around the enlarged diameter region 94 there is greater friction, and accordingly increased dampening force, imposed on the movable portion of the pressure responsive member. This permits the regulator to compensate for oscillations associated with high flow rates. On the other hand, as the poppet assembly moves toward its closed position, the O-ring engages tapering region 96 or the reduced diameter region 92. Less friction occurs between the O-ring and the axial member along these regions. This, in turn, provides less drag on the poppet arrangement. Accordingly, at very low flow rates associated with positions of the poppet adjacent the shut-off or closed position, the movable portion of the pressure responsive member can move more freely. In other words, the pressure regulator can respond to minute changes. This arrangement provides a sensitivity at very low flow rates while still addressing problems associated with oscillations at high flow rates.

Turning again to FIGS. 1-3, and additionally FIG. 4, the means for retaining the poppet assembly on the pressure responsive member is more particularly illustrated. The cross-sectional view (FIGS. 1 and 2) of the retaining means 100 best illustrates its planar configuration in a normal, unbiased state. As will be described further below, the planar configuration reduces the cost to manufacture the retaining means in comparison to prior arrangements.

The retaining means has a serpentine configuration shown in FIG. 4 in which elongated, flexible arms 102, 104 are secured at their innermost ends 106 to the movable portion 34 of the regulator. Preferably, the arms are spot welded at 106 to the surface of the movable portion. The retaining means has a symmetrical configuration as apparent in FIG. 4, so that description of one arm isoequally applicable to the other. Arm 102, as indicated above, is secured at its inner end 106 and then proceeds along a generally arcuate or circumferential path 108. The arm then changes its direction through 180° at reverse curve portion 110 and continues along a radially outer position defining a second generally circumferential path 112. The second circumferential path proceeds past the secured end and then proceeds radially inward toward the stem 62.

A squared opening 114 receives the stem therethrough. The squared opening is sized to axially retain the base 64 of the poppet member but still allows the stem a predetermined amount of radial movement so that the poppet can self-center relative to the valve seat. Still further, this configuration cooperates with that of the base member to prevent rotation of the poppet stem so that the self-threading poppet can be rotated and advanced on the outer end of the stem.

The normally planar retaining means is preferred because of its lower manufacturing cost. No bending is required, and the retaining means can be easily formed from flat stock material. Still another important advantage of this arrangement is that the surface finish can be extrusion honed to a micro finish because of its planar configuration. This is extremely critical in, for example, the microelectronics industry where there is great concern for highly polished surfaces that address problems associated with impurities. On the other hand, the serpentine configuration still allows the retaining means to easily flex. This flexing action is important to retain the poppet on the stem as best illustrated by a comparison of FIGS. 2 and 3. In an over pressure situation (FIG. 3), the bellows will completely collapse, i.e., approach its stack height, and a rigid retaining means would tightly hold the poppet stem against the movable portion 34 and impose pull out forces on the poppet and stem. By providing elongated, flexible arms in the retaining means as described above, the poppet will generally maintain its same seating force against the valve seat, and the required flexure or axial elongation in the arrangement is taken up by the arms 102, 104.

Due to its construction, as the bellows flattens and approaches its stack- height, the spring rate of the bellows becomes very high. The flexible retaining means, as described above, allows the bellows to collapse or flatten during high pressure or over pressure situations without destroying the poppet assembly.

Additionally, the movable and stationary portions of the pressure responsive member include means for protecting the bellows in an over pressure situation. The protecting means includes cooperating flanges 116, 118 that protrude in facing relation from the stationary and movable portions, respectively. When the bellows flattens in an over pressure situation, the first and last diaphragms that comprise the bellows construction are supported by the flanges 116, 118. For example, a pressure regulator could be exposed to high pressure if the poppet does not seal due to large particulates, or if high pressure is applied downstream of the regulator. In any event, the flanges will protect the bellows from damage when it flattens and approaches its stack height.

If the cavity 90 were to lose its pressurized charge, the pressure responsive member would typically move toward a closed position. A biasing means, such as spring 120, is incorporated into the regulator to counteract the spring effect of the bellows assembly and assure that the poppet moves to the closed position if the charge is lost. As shown, a first end 122 of the spring cooperates with a shoulder on the axial member 44. A second end 126 of the spring abuts against the holding member 84 and the opposite end of member 84 is constrained by a snap ring 128 in the sleeve portion 46. Thus, the biasing force of the spring tends to urge the movable portion 34 rightwardly or toward the outlet, thus advancing the poppet toward the valve seat and a shutoff position. Of course, other biasing arrangements may be used, within the spirit and scope of the subject invention.

Moreover, the spring 120 balances or negates the spring effect of the bellows by providing a very slight bias toward the closed position. This allows the regulator to be more sensitive or responsive to slight pressure changes without being effected by the relatively large spring rate.

The invention has been described with reference to the preferred embodiment. Obviously, modifications and alterations will occur to others upon a reading and understanding of this specification. For example, the poppet retaining means may adopt other configurations that perform the same function in substantially the same way. The dampening force varying means may be reversed in assembly so that the taper and different diameter portions are provided on the movable portion of the pressure responsive member. It is intended to include all such modifications and alterations, and others, insofar as they come within the scope of the appended claims or the equivalents thereof.

Having thus described the invention, it is now claimed:

1. A pressure regulator comprising:
a housing having a chamber defined therein;
an inlet and outlet for communicating with the chamber; and
a pressure responsive member interposed between the inlet and outlet for regulating fluid communication therebetween, a first portion of the pressure responsive member being fixed relative to the housing and a second portion of the pressure responsive member being movable relative to the chamber in response to fluid pressure, the pressure responsive member including means for varying the freedom of movement thereof at different positions to allow freer movement of the pressure responsive member adjacent a shutoff position and a dampened range of movement adjacent a full open position, the varying means including a resilient member interposed between the first and second portions that exerts a dampening force on the relative movement between the first and second portions and a tapered surface with which the resilient member cooperates to vary the dampening force.

2. The pressure regulator as defined in claim 1 wherein the tapered surface is located on the first portion of the pressure responsive member.

3. The pressure regulator as defined in claim 2 wherein the resilient member is annular and the tapered surface is received therein, an enlarged diameter of the tapered region being associated with a full open position and a reduced diameter of the tapered region being associated with the shutoff position.

4. The pressure regulator as defined in claim 1 wherein the varying means including a resilient member operatively associated with one of the first and second portions to provide the variable freedom of movement of the pressure responsive member.

5. The pressure regulator as defined in claim 1 further comprising a means for biasing the pressure responsive member to the shutoff position.

6. A pressure regulator comprising:
a housing having a chamber defined therein and an inlet and outlet selectively communicating with the chamber depending on the location of a pressure responsive member that moves relative to the housing in response to fluid pressure;
the pressure responsive member including an enclosed cavity having a predetermined charge therein and a flexible member operatively associated with the cavity for expanding and contracting the volume of the cavity in response to the pressure in the chamber;
a poppet assembly extending from the pressure responsive member for cooperation with a valve seat adjacent one of the inlet and outlet, the poppet assembly including a poppet adapted to selectively engage the valve seat; and
means for interconnecting the poppet assembly to the pressure responsive member, the interconnecting means including a normally planar member having an elongated flexible portion that is secured adjacent a first end to the pressure responsive member and receives the poppet assembly at a second end, the flexible portion moving out of its normally planar configuration during selected ranges of movement of the poppet assembly.

7. The pressure regulator as defined in claim 6 wherein the elongated flexible portion has a symmetrical configuration to balance the forces imposed on the poppet.

8. The pressure regulator as defined in claim 6 wherein the second end of the flexible portion is centrally located for receiving the poppet assembly and the first end is spaced radially outward therefrom.

9. The pressure regulator as defined in claim 8 wherein the flexible portion includes an intermediate region between the first and second ends that has radially spaced circumferentially extending portions that maximize the length of the flexible portion.

10. The pressure regulator as defined in claim 6 further comprising means for varying the freedom of movement of the pressure responsive member between fully contracted and expanded states of the cavity.

11. The pressure regulator as defined in claim 6 further comprising means for biasing the poppet assembly toward engagement with the valve seat.

12. The pressure regulator as defined in claim 6 further Comprising means for altering the dampening force imposed on the pressure responsive member during selected ranges of movement thereof.

13. A pressure regulator comprising:
a housing having a chamber defined therein that selectively communicates with an inlet and an outlet;
a pressure responsive member received in the chamber having a stationary portion fixed relative to the housing and a movable portion, the stationary and movable portions being interconnected by a flexible member that surrounds a predetermined pressure charge to expand and contract in response to pressure variations in the chamber;
mean for varying a dampening force imposed on movement of the pressure responsive member between open and closed positions;
a poppet assembly operatively associated with the pressure responsive member adapted to regulate fluid pressure between the inlet and outlet; and
means for biasing the poppet assembly toward a closed position.

14. The pressure regulator as defined in claim 13 wherein the varying means includes a resilient member interposed between the stationary an movable portions, and different diameter regions engaging the resilient member to vary the drag imposed thereby.

15. The pressure regulator as defined in claim 13 further comprising a planar retaining means interconnecting the poppet assembly and the pressure responsive member, the retaining means includes an elongated flexible member that extends from its planar configuration during selected ranges of movement of the poppet assembly.

16. The pressure regulator as defined in claim 15 wherein the retaining means includes first and second flexible members, each being secured adjacent a first end to the pressure member and receiving the poppet assembly adjacent a second end.

17. The pressure regulator as defined in claim 16 wherein the first and second flexible members are symmetrically arranged about a longitudinal axis of the regulator.

18. The pressure regulator as defined in claim 17 wherein the first and second flexible members each include an intermediate region between the first and second ends that includes radially spaced circumferentially extending portions that maximize the length of the flexible members.

19. A pressure regulator comprising:
a housing having a chamber defined therein;
an inlet and outlet for communicating with the chamber; and
a pressure responsive member interposed between the inlet and outlet for regulating fluid communication therebetween, the pressure responsive member having a first movable portion and a second stationary portion, the pressure responsive member further including means for varying the freedom of movement thereof at different positions to allow freer movement of the pressure responsive member adjacent a shutoff position and a dampened range of movement adjacent a full open position, the varying means including a resilient member operatively associated with one of the first and second portions, and different fixed diameter portions on the other of the first and second portions that are adapted to engage the resilient member and provide the variable freedom of movement of the pressure responsive member.

20. A pressure regulator comprising:
a housing having a chamber defined therein;
an inlet and outlet for communicating with the chamber;
a pressure responsive member interposed between the inlet and outlet for regulating fluid communication therebewteen, at least a portion of the pressure responsive member being movable relative to the chamber in response to fluid pressure, the pressure responsive member including means for varying the freedom of movement thereof at different positions to allow freer movement of the pressure responsive member adjacent a shutoff position and a dampened range of movement adjacent a full open position; and
means for biasing the pressure responsive member to the shutoff position.

21. A pressure regulator comprising:
a housing having a chamber defined therein that selectively communicates with an inlet and an outlet;
a pressure responsive member received in the chamber having a stationary portion fixed relative to the housing and a movable portion, the stationary and movable portions being interconnected by a flexible member that surrounds a predetermined pressure charge to expand and contract in response to pressure variations in the chamber;
a poppet assembly operatively associated with the pressure responsive member adapted to regulate fluid pressure between the inlet and outlet;
means for biasing the poppet assembly toward a closed position; and
a planar retaining means interconnecting the poppet assembly and the pressure responsive member, the retaining means includes an elongated flexible member that extends from its planar configuration during selected ranges of movement of the poppet assembly.

* * * * *